US012172192B2

(12) United States Patent
Lee et al.

(10) Patent No.: US 12,172,192 B2
(45) Date of Patent: Dec. 24, 2024

(54) AIR CLASSIFIER

(71) Applicant: VOLT CARBON TECHNOLOGIES INC., Calgary (CA)

(72) Inventors: V-Bond Lee, Newmarket (CA); Travis Duke Krebs, Toronto (CA)

(73) Assignee: VOLT CARBON TECHNOLOGIES INC., Calgary (CA)

( * ) Notice: Subject to any disclaimer, the term of this patent is extended or adjusted under 35 U.S.C. 154(b) by 246 days.

(21) Appl. No.: 17/861,561

(22) Filed: Jul. 11, 2022

(65) Prior Publication Data

US 2024/0009707 A1 Jan. 11, 2024

(51) Int. Cl.
*B07B 4/02* (2006.01)
*B07B 9/00* (2006.01)

(52) U.S. Cl.
CPC ................ *B07B 4/025* (2013.01); *B07B 9/00* (2013.01)

(58) Field of Classification Search
CPC .............. B07B 4/025; B07B 9/00; B07B 4/02
USPC ............................................................ 209/21
See application file for complete search history.

(56) References Cited

U.S. PATENT DOCUMENTS

| | | | | |
|---|---|---|---|---|
| 1,834,981 A * | 12/1931 | Stebbins | B07B 7/04 | 55/440 |
| 6,631,808 B2 * | 10/2003 | Sparks | B07B 4/02 | 209/33 |
| 6,739,456 B2 | 5/2004 | Svoronos et al. | | |
| 6,878,192 B2 | 4/2005 | Pasic | | |
| 8,800,776 B2 * | 8/2014 | Linnhoff | B07B 4/08 | 209/471 |
| 2003/0057138 A1 | 3/2003 | Sparks | | |
| 2011/0132814 A1 | 6/2011 | Miller | | |
| 2018/0141087 A1 | 5/2018 | Orsyk | | |

FOREIGN PATENT DOCUMENTS

| | | |
|---|---|---|
| CN | 214718400 U | 11/2021 |
| RU | 186884 U1 | 2/2019 |
| WO | WO-2019022690 A1 | 1/2019 |

* cited by examiner

*Primary Examiner* — Michael McCullough
*Assistant Examiner* — Jessica L Burkman
(74) *Attorney, Agent, or Firm* — PERRY + CURRIER INC.

(57) ABSTRACT

An air classifier for classifying a mixture of fine and coarse particles by size or aerodynamic shape, wherein the air classifier generally comprises a settling box through which a laminar airflow passes that improves introduction of particles into the airflow and thus improves separation and grading of particles by the air classifier.

14 Claims, 4 Drawing Sheets

AIR CLASSIFIER

BACKGROUND OF THE INVENTION

1. Field of the Invention

The present invention is directed to improvements to a gravitational cross-flow air classifier for extracting flake graphite from host rock using an unobstructed air inlet as well as vibratory screen separators.

2. Description of the Related Art

Commercially air classifiers are available. Such classifiers include classifiers described in U.S. Patent Publication No. US 2003/0057138 A1 (Mar. 27, 2003) These classifiers provide a gravitational cross-flow air classifier with a honeycomb and screen combination in the air inlet to classify (i.e. size or screen) airborne particulates according to the mesh size of the honeycomb and screen combination. Generally, such prior art classifiers provide adequate separation and grading of particles. However, the shape and size of flake graphite particles (a naturally occurring type of graphite mineral consisting of carbon that has a distinctly flaky morphology and is typically found as discrete flakes) presents less consistent sorting or grading of particles.

Other prior art air classifier systems suffer from ineffective control of the particle feed stream. Using prior art techniques, the feed of particles entering an air classifier often falls as a thin stream transverse to the flowing air. At operational feed rates, the particles do not fall individually as they enter the classifier, but rather as a "curtain'. The incoming feed curtain blocks the air flow at the top of the classifier, diverting the air downward, negating the effort of creating an even, undisturbed air stream. Further, the particles falling in the feed curtain are not separated during the fall into the air stream. The fine particles fall along with the larger particles, instead of being blown free of them. This results in a defective separation, with smaller particles falling into receiving chambers closer to the air inlet meant for the large particles.

SUMMARY OF THE INVENTION

It is an aspect of the present invention to provide an air classifier having a laminar airflow through a settling box that improves introduction of flake graphite particles into the airflow and thus improves separation and grading of flake graphite particles by the air classifier.

According to one aspect of the invention, there is provided an air classifier for separating and grading particles. The air classifier has a settling box having an inlet and outlet. A fan is positioned at the outlet for generating and drawing an airflow through the settling box in a direction from the inlet to the outlet. A plurality of vibratory receptacles receives and secondarily sorts particles. A material diffuser column gravity feeds particles into the airflow, wherein the airflow and gravity separates and sorts the particles towards one of the vibratory receptacles wherein vibratory screens secondarily separate and sort the particles.

Additional aspects include the provision of an open inlet for laminar airflow, vertical introduction of material with alternating deflectors that are optionally adjustable, wherein the lowest deflector introduces the material in the direction of the airflow, and multiple vibratory receptacles are spaced across the airflow for receiving particles of decreasing size and weight from inlet to outlet, each optionally including a vibratory screen with vibratory motor and upper and lower exit ports for secondary separation.

The above aspects can be attained by an air classifier for separating and grading particles comprising: a settling box having an inlet and outlet, a fan positioned at the outlet for generating an airflow through the settling box in a direction from the inlet to the outlet, a plurality of vibratory receptacles for receiving and secondarily sorting particles, a material diffuser column for gravity feeding particles into the airflow, wherein airflow and gravity separates and sorts the particles towards one of the vibratory receptacles and the vibratory receptacles secondarily separate and sort the particles.

In other aspects, a method is provided for separating and grading particles using an air classifier, comprising: generating an airflow through a settling box in a direction from an inlet to an outlet of the settling box; gravity feeding particles of material into the airflow; separating and sorting the particles based on aerodynamic properties into a plurality of receptacles spaced between the inlet and the outlet such that heavier particles land in receptacles proximate the inlet and smaller particles travel downstream to receptacles proximate the outlet.

In further aspects, a system is provided comprising: a primary crusher breaker for initially crushing material; a first screen deck for filtering the crushed material; a secondary crusher for receiving and further crushing unfiltered material from the first crusher breaker; a second screen deck for filtering the further crushed material; a tertiary crusher for receiving and further crushing unfiltered material from the secondary crusher breaker; a third screen deck for further filtering the filtered material from the first screen deck, second screen deck and tertiary crusher; and a conveyor for conveying the further filtered material to an air classifier.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 2:
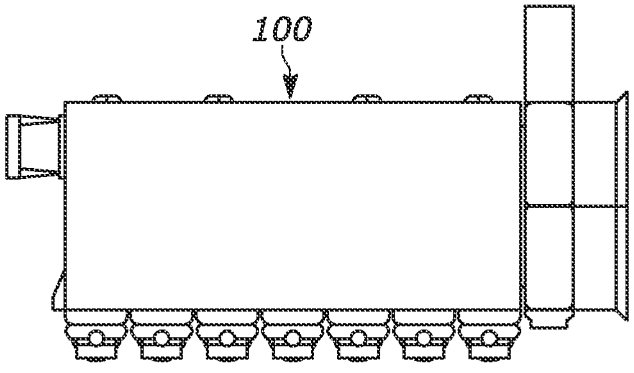
FIG. 2 is a side view of the embodiment of FIG. 1.
Figure 1:
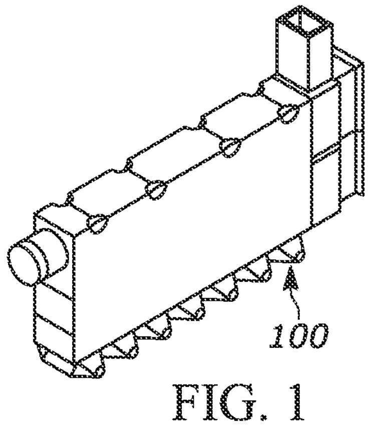
FIG. 1 is a perspective view of an air classifier according to an embodiment of the present invention.
Figure 3:
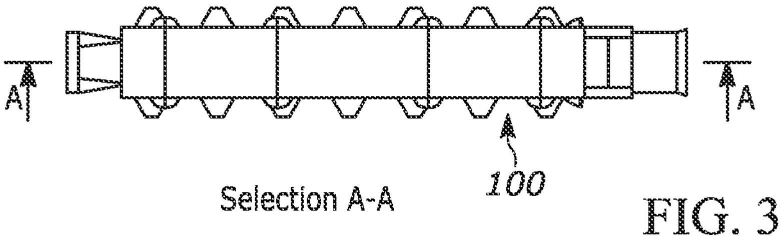
FIG. 3 is a top view of the embodiment of FIG. 1.
Figure 4:
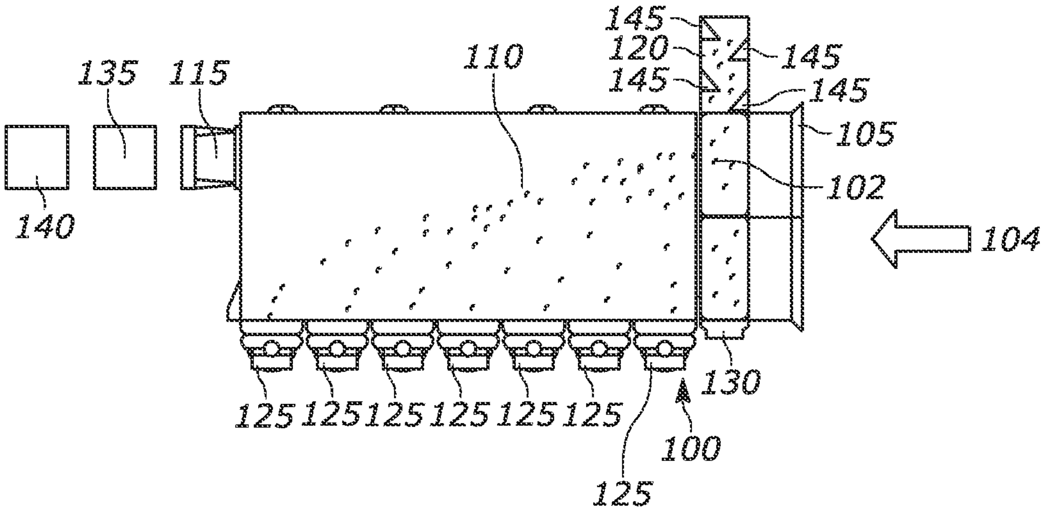
FIG. 4 is a sectional view along the section A-A of FIG. 3.

In FIGS. 1-4, an air classifier 100 is shown for classifying material 102 carried by a laminar air flow 104, according to an embodiment of the present invention. The air classifier 100 generally comprises an air inlet 105 at a first end of a settling box 110, an outlet 115, a material diffuser column 120, a plurality of vibratory receptacles 125, a coarse reject receptacle 130, a baghouse filter 135 and a variable speed fan 140. In embodiments, at least one side of the settling box 110 can be made of a clear material allowing for imaging and viewing of the separation and sorting of said particles and/or the settling box 110 and be constructed of or coated with conductive material and grounded to dissipate static electricity.

Figure 5:
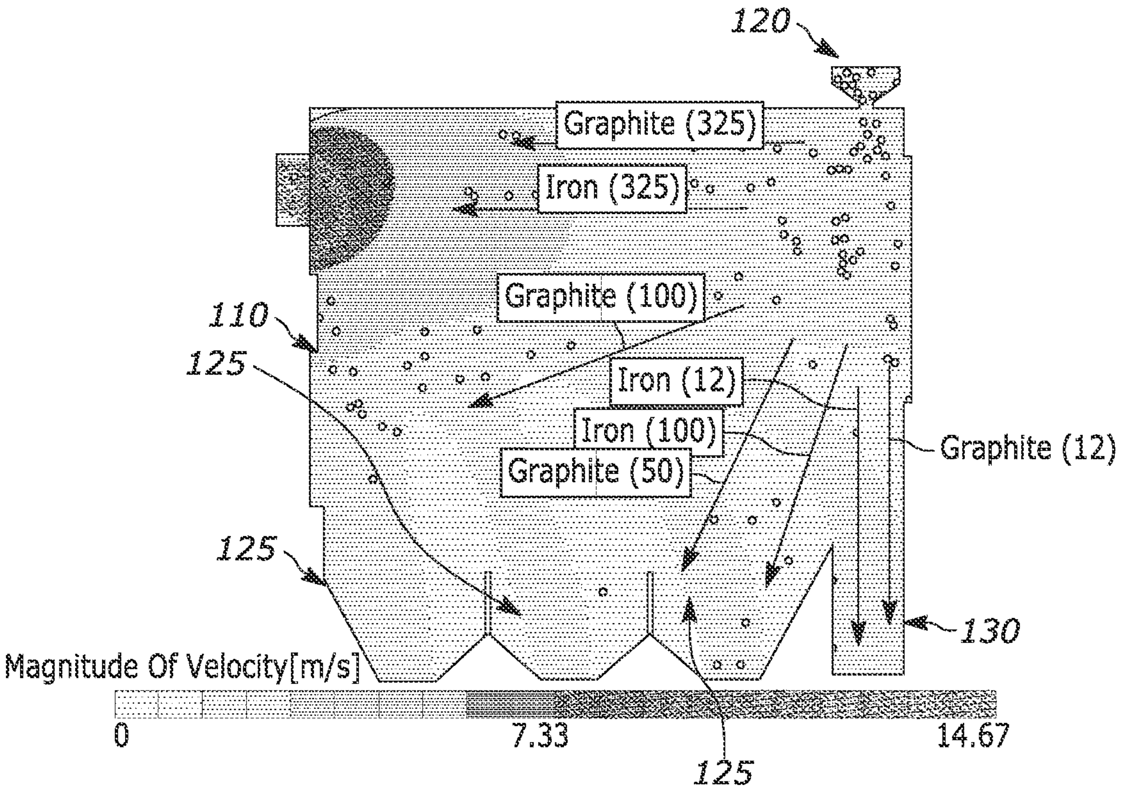
FIG. 5 is a schematic illustration showing classification of particles of different size according to the air classifier of FIGS. 1-4.

The variable speed fan 140 draws air into the classifier 100 through the air inlet 105, which is an open inlet for creating a laminar airflow longitudinally through the settling box 110. The air flows horizontally through the settling box 110 from the inlet 105 to the outlet 115, which is located near the top of the settling box 110. Locating the outlet 115 near the top of the settling box 110 draws part of the airflow 104 upward as it approaches the outlet 115, creating regions of airflow of different velocities, as shown in FIG. 5, such that the heaviest particles (e.g. iron (12) and graphite (12)) fall into the coarse reject receptacle 130 while particles of increasing lightness fall into receptacles 125 increasingly distant from the air inlet 105.

When the airflow exits through the outlet 115, it passes through the baghouse filter 135 before being exhausted by the variable speed fan 140. Fine particles of flake graphite and silica are captured in the baghouse filter 135 and collected. The variable speed fan 140 can be in front of the baghouse filter 135 in some configurations. The baghouse filter 135 need not necessarily be first in the airflow from outlet 115.

Particle material 102, usually crushed ore containing flake graphite and silica to be separated and graded, is fed into the air classifier 100 through the material diffuser column 120. Diffuser column 120 includes alternating deflectors 145 for breaking up the material and slowing its descent into the classifier 100. The material 102 enters the settling box 110 downstream of the air inlet 105, where it is introduced into the impinging laminar air flow 104.

Optionally, deflectors 145 can be made adjustable by remote mechanical means. Preferably, the last or bottom-most deflector is oriented such that the particle material 102 enters the airflow 104 generally in the direction of the airflow 104.

Optionally, the height of the material diffuser column 120 and number of deflectors 145 can be altered to adjust the number of times the particle material 102 impacts on the deflectors 145.

Heavy particles descend straight through the airflow to the coarse reject receptacle 130. Gravitational forces and the horizontal airflow separate lighter particles within the settling box 110, with the material falling onto the vibratory receptacles 125 lining the bottom of the settling box 110, as discussed above. Although the embodiment illustrated in FIGS. 1-4 includes five vibratory receptacles 125, settling box 110 may include a fewer or greater number of vibratory receptacles 125.

Figure 6:
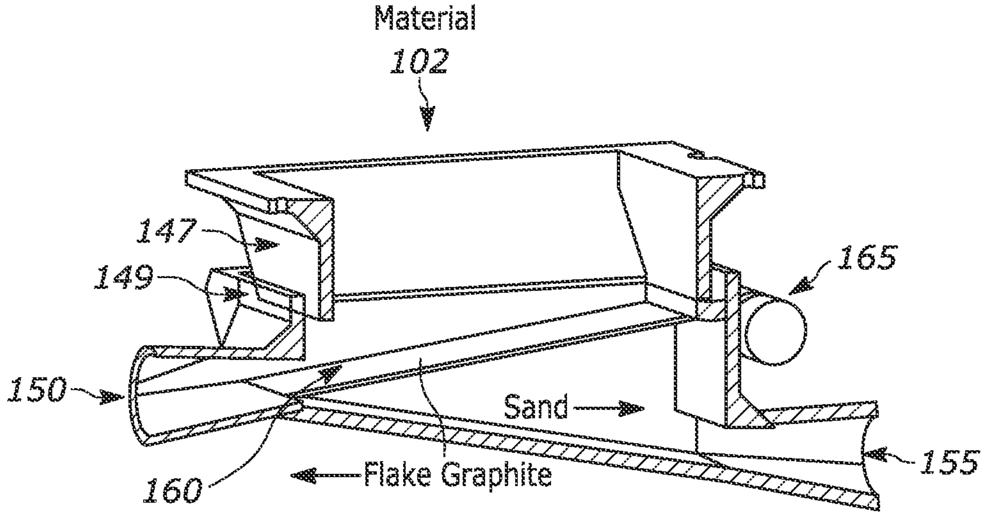
FIG. 6 is a detail cross-sectional view of a vibratory receptacle of an air classifier according to an embodiment of the present invention.

FIG. 6 shows details of a vibratory receptacle 125 for receiving material 102 that settles downwardly from the settling box 110. The vibratory receptacle 125 is mounted to the settling box 110 via a fixed portion 147 that rests on a vibrating portion 149. The vibrating portion 149 includes an upper exit port 150 and lower exit port 155. A vibratory mesh screen 160 is mounted at an angle such that the vibratory motion of the screen causes particles to translate along the screen. The vibratory screen 160 is actuated via a vibratory motor 165 mounted on the outside of the vibrating portion 149. The vibratory receptacle 125 can fixed to the settling box 110 via dampers (not shown) to reduce the amount of vibration transferred to the settling box 110.

Particle material 102 in the airstream 104 of the settling box 110 descends onto the vibratory receptacles 125 depending on size, weight and shape. Heavier particles 102 land in the vibratory receptacles 125 closest to inlet 105 while smaller, more aerodynamic particles 102 travel downstream vibratory receptacles 125 closest to the outlet 115, as shown in FIG. 5. The motion of the vibratory motor 165 causes the material to be sieved by the vibratory mesh screen 160. Material which passes through the vibratory mesh screen 160 is drawn out via the lower exit port 155, which has a slope that facilitates translation of the material. Larger particles which do not pass through the screen are drawn out through the upper exit port 150 via the sloped vibratory mesh screen 160. Both the upper exit port 150 and the lower exit port 155 are closed to the outside such that air flow does not travel into the settling box 110 via these ports.

Figure 7:
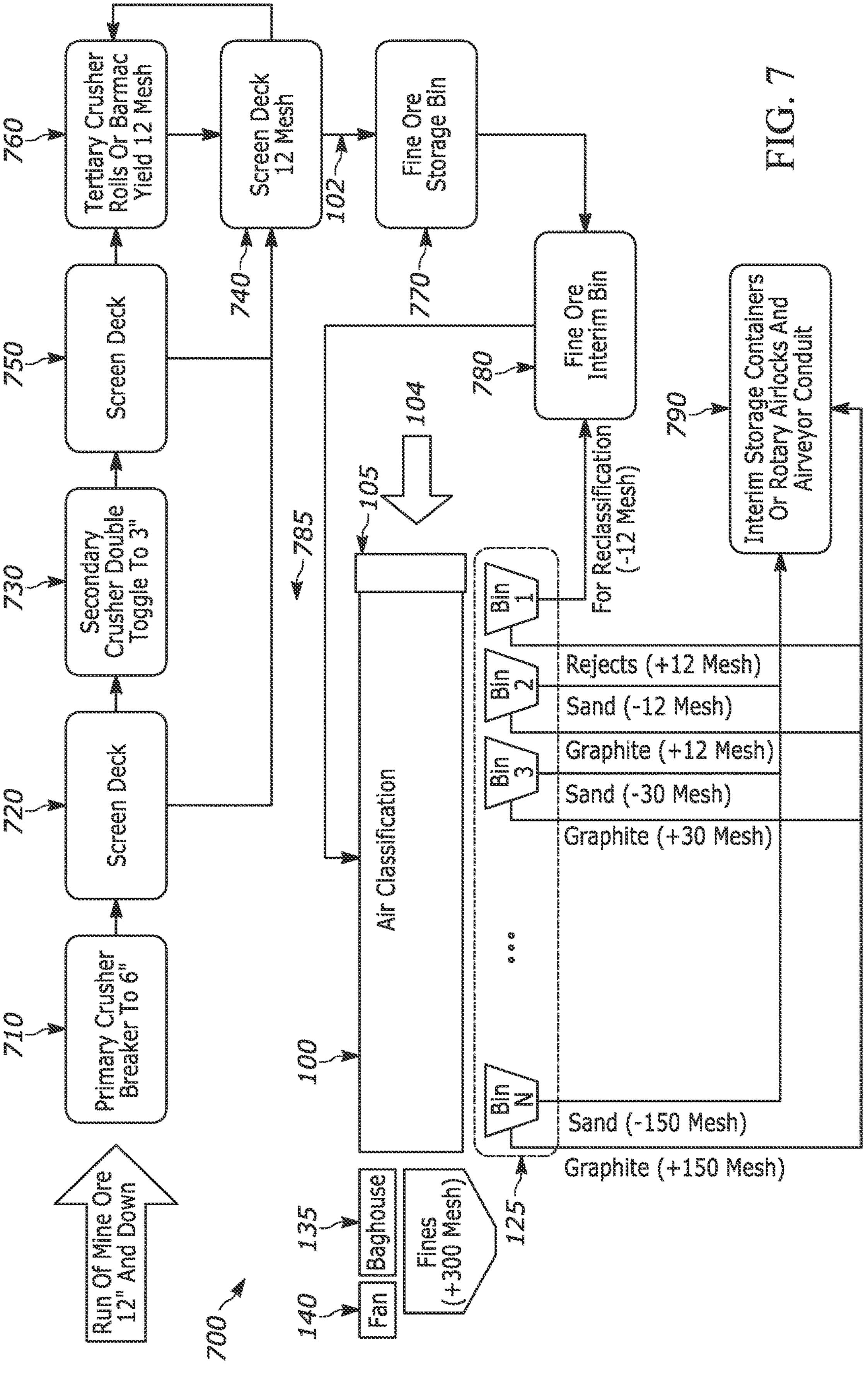
FIG. 7 is a block diagram of a system incorporating the air classifier of FIG. 1, according to an embodiment.

FIG. 7 shows a system 700 incorporating the air classifier 100, according to an embodiment. Mine ore of size 12" or less is initially crushed to 6" using a primary crusher breaker 710 and conveyed to a first screen deck 720. The crushed material is then conveyed to a secondary crusher 730 and crushed to 3", while smaller pieces of material pass through the screen deck 720 to a further screen deck 740. The material crushed by secondary crusher 730 is then conveyed to a screen deck 750, while smaller pieces of material pass through screen deck 750 to screen deck 740. A tertiary crusher 760 further crushes the material from screen deck 750 and passes the crushed material to screen deck 740. Pieces of material that are too large to pass through screen deck 740 (e.g. larger than 12 mesh) recirculate to tertiary crusher 760 for further crushing. The crushed material 102 that passes through screen deck 740 may be held in an optional fine ore storage bin 770 before passing to an optional fine ore interim bin 780 and thence to the air classifier 100 via a conveyor 785 to material diffuser column 120 for sorting and separation, as discussed above.

According to the air classifier 100 depicted in system 700, coarse material (e.g. −12 mesh) deposited in Bin 1, which can be the coarse reject receptacle 130, is recirculated for reclassification via the air classifier 100, while material smaller than 12 mesh and material collected in the remaining bins (e.g. sand and gravel of decreasing size from Bin 1 to Bin N) is conveyed to interim storage containers or rotary airlocks and conduits 790.

Figure 8:
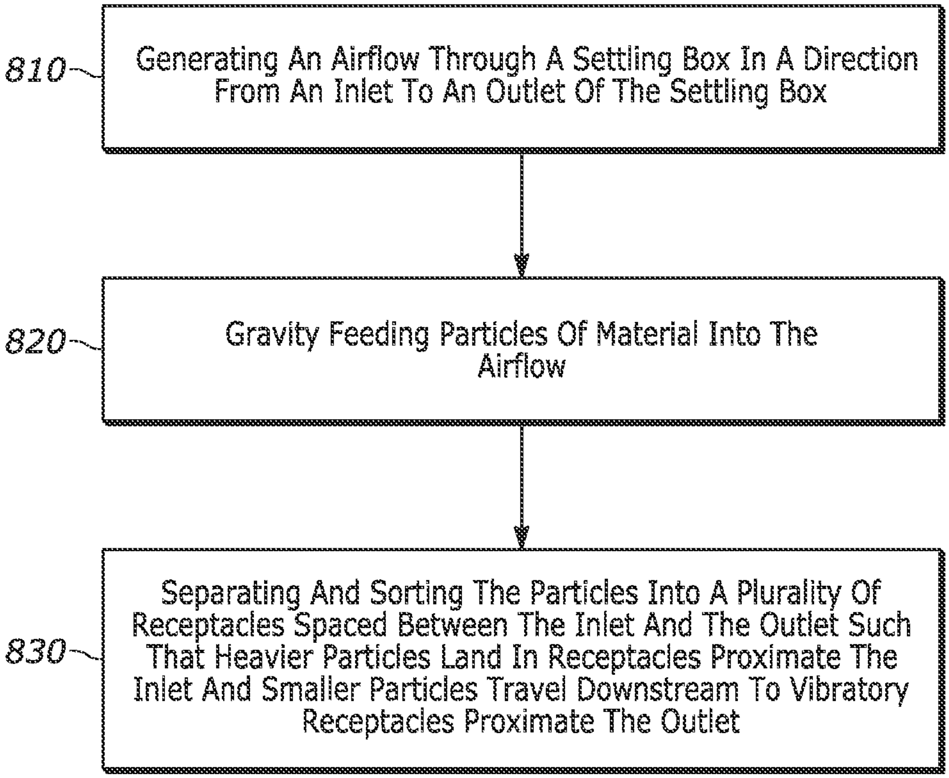
FIG. 8 shows a method of separating and grading particles using the air classifier.

FIG. 8 shows a method 800 of separating and grading particles using air classifier 100. At 810, an airflow is generated through settling box 110 in a direction from 105 inlet to outlet 115. At 820, particles of material are gravity fed into the airflow 104. At 830, the particles are separated and sorted into receptacles 125 spaced between the inlet 105 and the outlet 115 such that heavier particles land in receptacles proximate the inlet and smaller particles travel downstream to receptacles proximate the outlet.

It will be understood that various details of the invention may be changed without departing from the Scope of the invention. Furthermore, the foregoing description is for the purpose of illustration only, and not for the purpose of limitation—the invention being defined by the claims.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An air classifier for separating and grading particles comprising:

a settling box having an inlet and outlet, a fan positioned at the outlet for generating an airflow through the settling box in a direction from the inlet to the outlet, a plurality of vibratory receptacles for receiving and secondarily sorting particles, a material diffuser column for gravity feeding particles into the airflow, wherein said airflow and gravity separates and sorts said particles towards one of said vibratory receptacles and said vibratory receptacles secondarily separate and sort said particles.

2. The air classifier as claimed in claim 1, wherein said inlet is free of obstructions to the airflow.

3. The air classifier as claimed in claim 2, wherein said material diffuser column is located above the inlet such that the airflow is unobstructed.

4. The air classifier as claimed in claim 3, wherein said material diffuser column comprises a plurality of alternating and adjustable deflectors.

5. The air classifier as claimed in claim 4, wherein a last of said deflectors is oriented such that particles enters the settling box in the direction of the air flow.

6. The air classifier as claimed in claim 5, wherein at least one side of the settling box is made of a clear material allowing for imaging and viewing of the separation and sorting of said particles.

7. The air classifier as claimed in claim 6, wherein said settling box is constructed of or coated with conductive material and grounded to dissipate static electricity.

8. The air classifier as claimed in claim 7, wherein further comprising a coarse reject receptacle located directly below the material diffuser column for receiving heaviest ones of said particles.

9. The air classifier as claimed in claim 8, wherein the outlet is located proximate the top of the settling box for drawing part of the airflow upward as it approaches the outlet, thereby creating regions of airflow of different velocities.

10. The air classifier as claimed in claim 1, wherein each of said plurality vibratory receptacles is mounted to the settling box via a fixed portion that rests on a vibrating portion.

11. The air classifier as claimed in claim 10, wherein the vibrating portion includes an upper exit port, a lower exit port and a vibratory mesh screen disposed at an angle such that vibratory motion of the mesh screen causes particles to translate along the screen to the lower exit port.

12. The air classifier as claimed in claim 11, further including a vibratory motor mounted on the outside of the vibrating portion for providing the vibratory motion to the mesh screen.

13. The air classifier as claimed in claim 12, wherein the vibratory receptacle is fixed to the settling box so as to reduce the amount of vibration transferred to the settling box.

14. Use of the air classifier as claimed in claim 1 for separating and grading flake graphite.

* * * * *